Dec. 5, 1961  L. J. KOCH ET AL  3,011,962
NUCLEAR REACTORS
Filed April 21, 1959  6 Sheets-Sheet 1
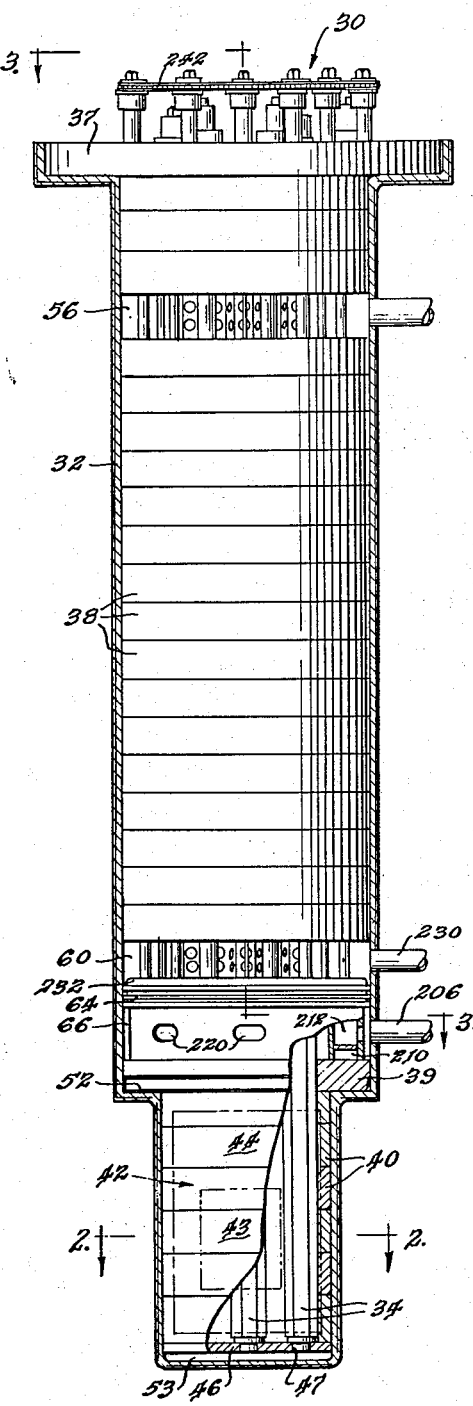
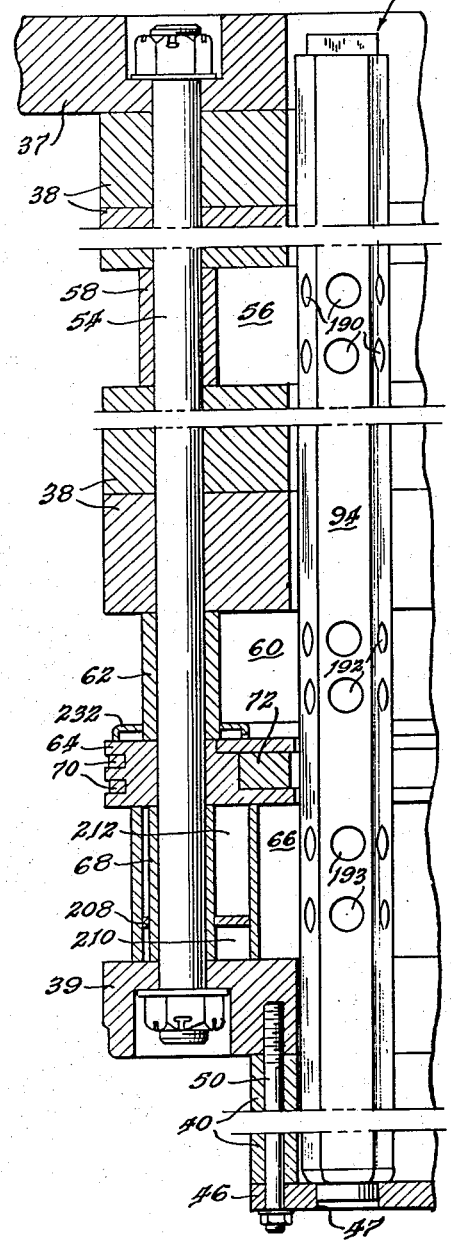
INVENTORS
Leonard J. Koch
Ralph E. Rice, Jr.
Alexander A. Denst
Anthony J. Rogers
Meyer Novick
By
Atty.

Dec. 5, 1961 L. J. KOCH ET AL 3,011,962
NUCLEAR REACTORS
Filed April 21, 1959 6 Sheets-Sheet 2
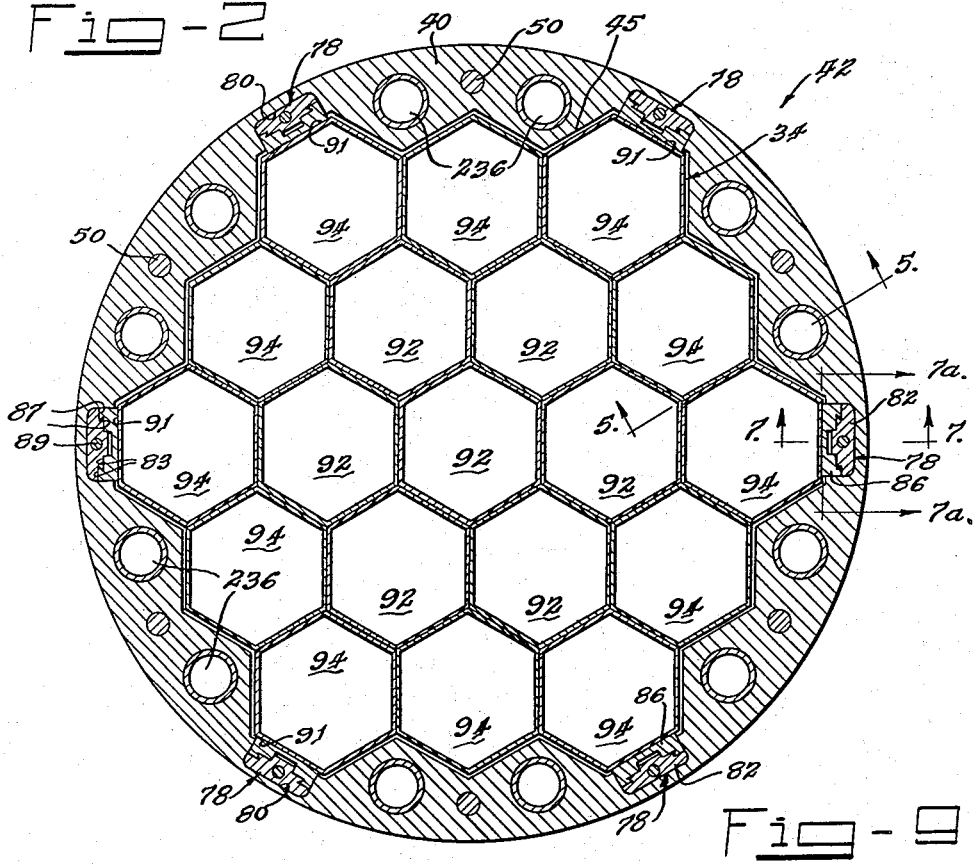
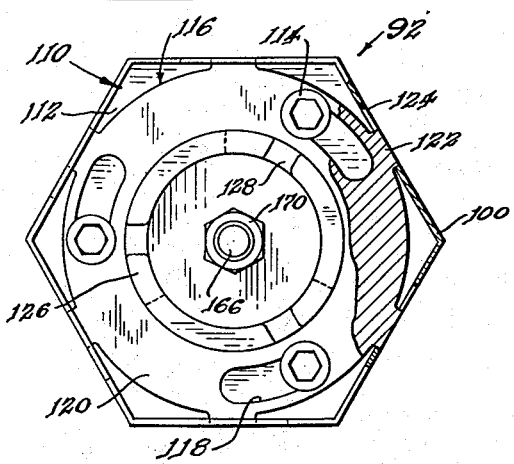
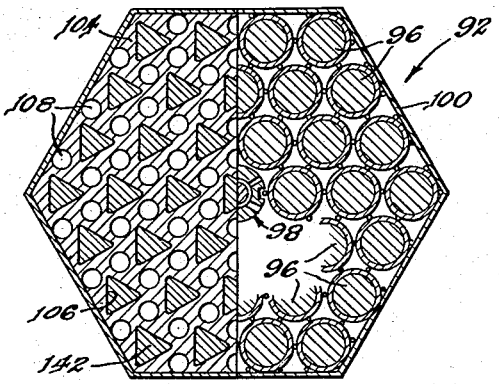
INVENTORS
Leonard J. Koch
Ralph E. Rice, Jr.
Alexander A. Denst
Anthony J. Rogers
Meyer Novick
BY INVENTORS
Leonard J. Koch
Ralph E. Rice, Jr.
Alexander A. Denst
Anthony J. Rogers
Meyer Novick
By: Richard G. Catty

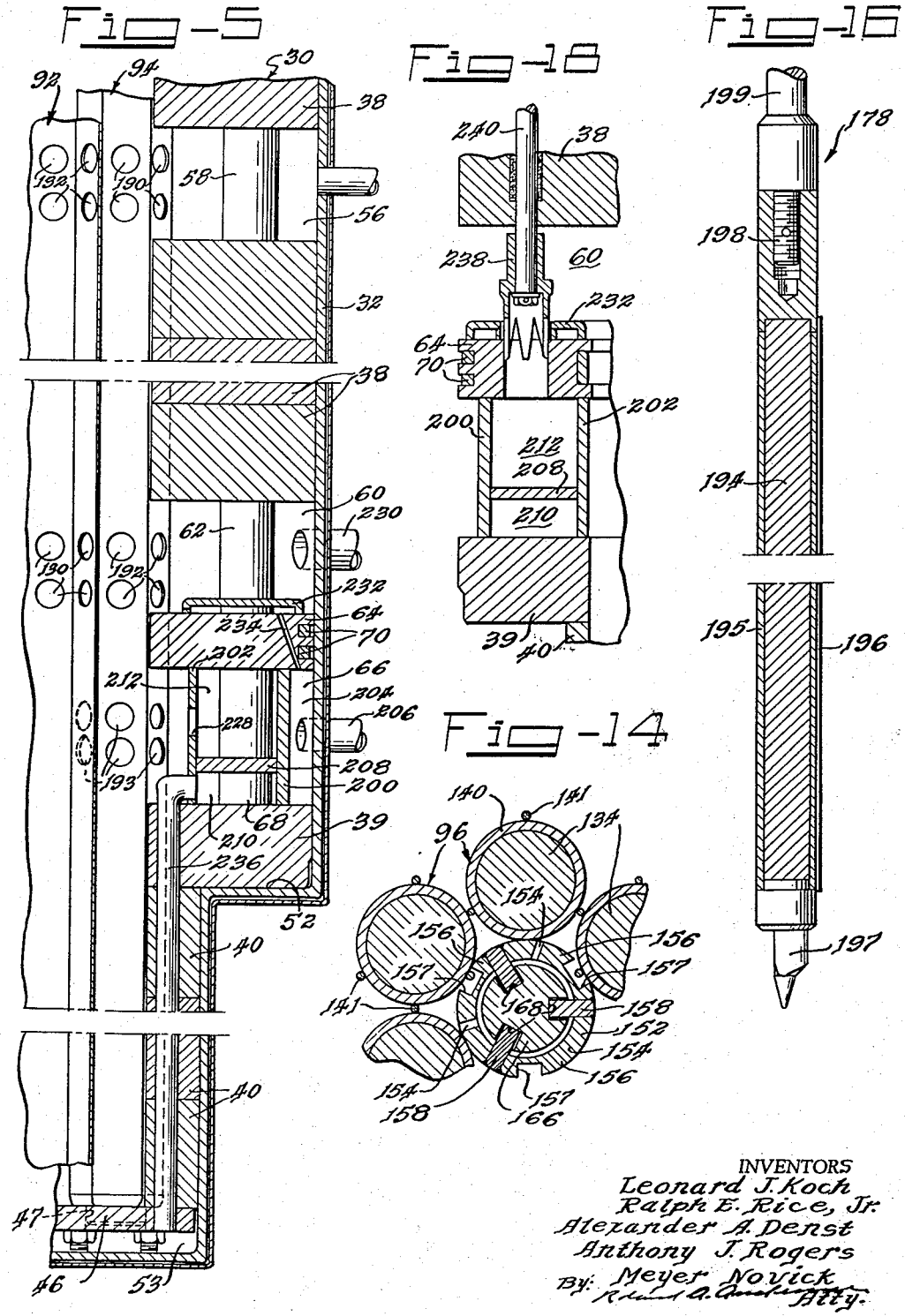

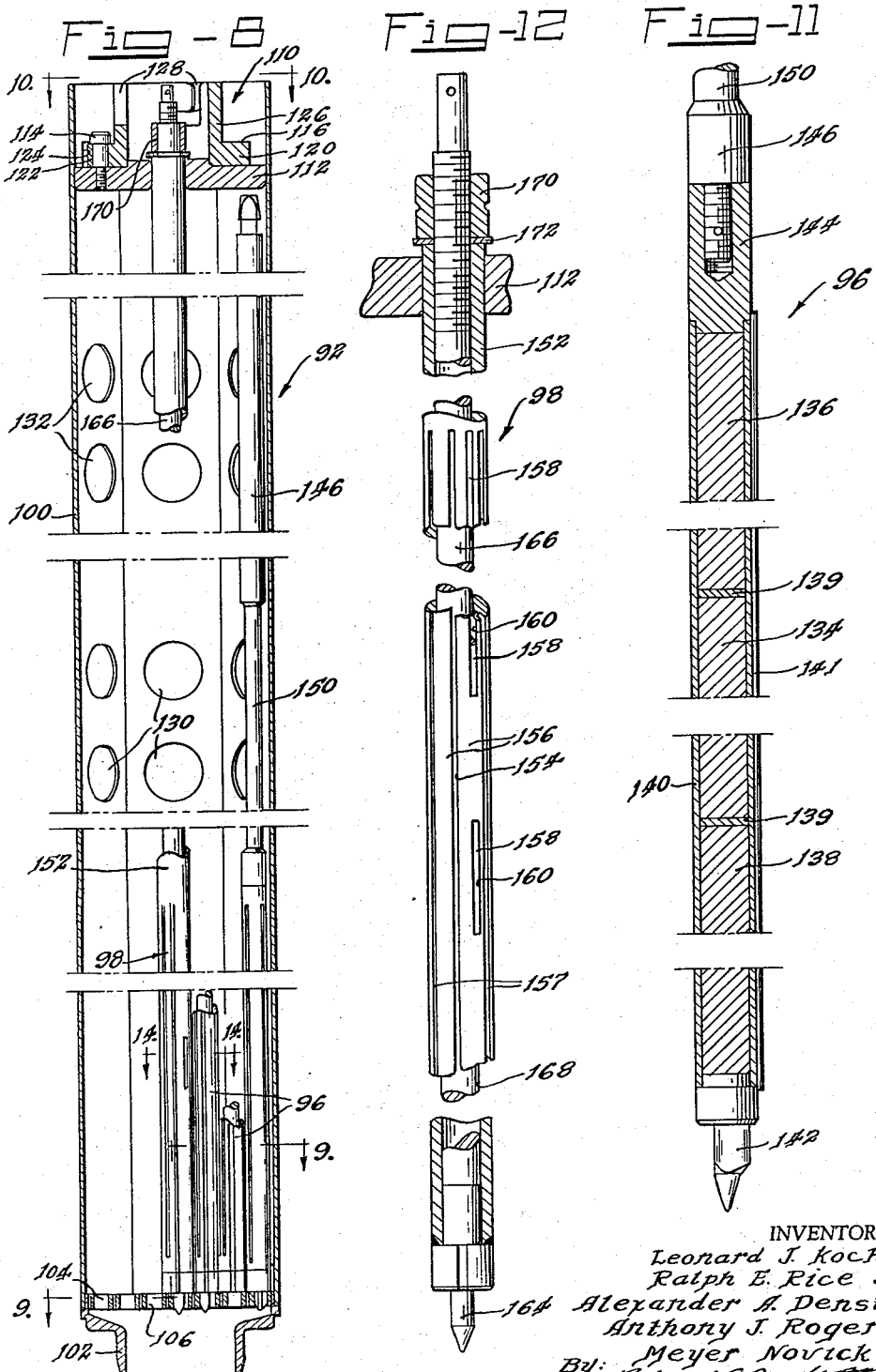

Dec. 5, 1961  L. J. KOCH ET AL  3,011,962
NUCLEAR REACTORS
Filed April 21, 1959  6 Sheets-Sheet 6
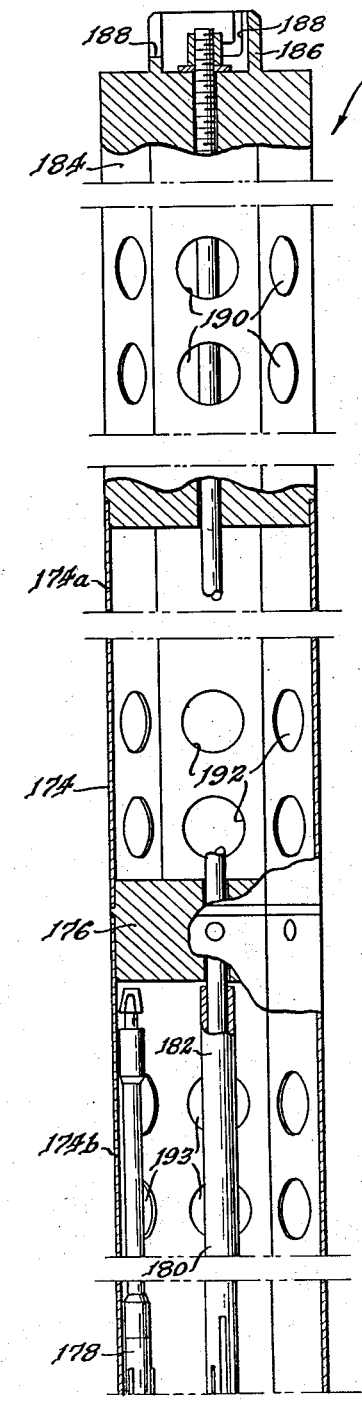
Fig-15
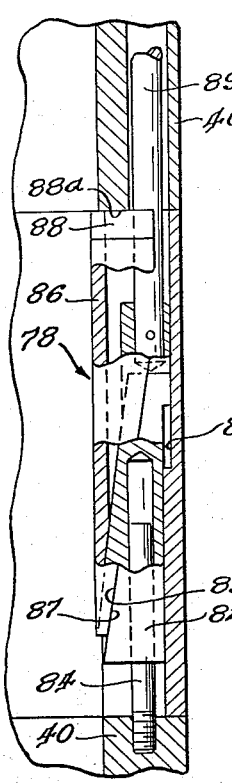
Fig-7
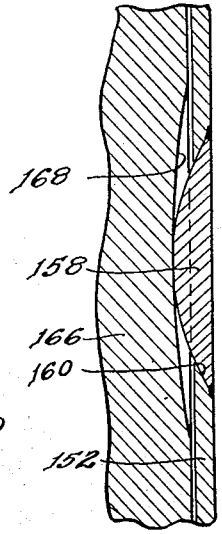
Fig-13
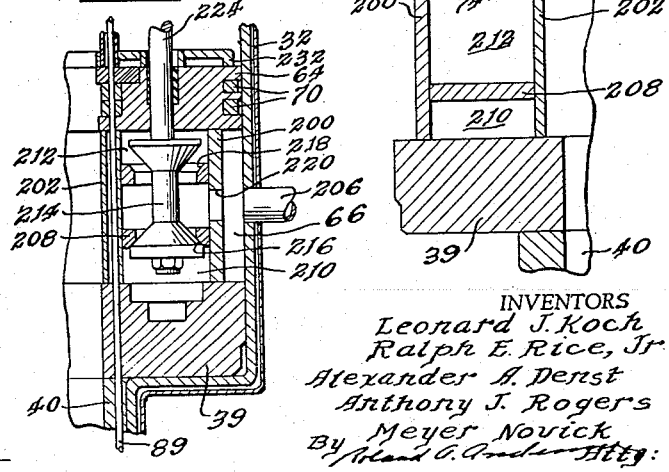
Fig-17
Fig-6
INVENTORS
Leonard J. Koch
Ralph E. Rice, Jr.
Alexander A. Denst
Anthony J. Rogers
Meyer Novick
By
Atty.

ent Office 3,011,962
Patented Dec. 5, 1961

3,011,962
NUCLEAR REACTORS
Leonard J. Koch, Clarendon Hills, Ill., Ralph E. Rice, Jr., Idaho Falls, Idaho, Alexander A. Denst, Chicago, and Anthony J. Rogers, Lisle, Ill., and Meyer Novick, Idaho Falls, Idaho, assignors to the United States of America as represented by the United States Atomic Energy Commission
Filed Apr. 21, 1959, Ser. No. 807,960
8 Claims. (Cl. 204—193.2)

This invention relates to nuclear reactors and more particularly to active portion assemblies for fast neutron reactors useful in the production of power and radioactive isotopes.

The Experimental Breeder I Reactor, hereinafter referred to as EBR–I, was designed to demonstrate the feasibility of power production with a liquid-metal-cooled, fast neutron reactor, and to demonstrate that such a reactor could breed fissionable material. The EBR–I reactor has been previously disclosed in the copending application Serial No. 721,108, now U.S. Patent No. 2,975,117, filed January 9, 1947, by Walter H. Zinn, and in the "Proceedings of the International Conference on the Peaceful Uses of Atomic Energy," vol. 3, pages 345–360, August 9, 1955, U.N. Publication, New York. The reactor first produced power in 1951 and during its operation it proved that neutron-fissionable fuel could be produced in the reactor at a greater rate than fissionable fuel was used in the operation of the reactor. It was found, however, that when operating conditions were made severe, i.e., high power at reduced coolant flow, an oscillation in power occurred which became more severe as power was increased or flow decreased. It had been further observed that, although the over-all temperature coefficient of the reactor was negative, a prompt positive coefficient was present which was overcome by a slower negative coefficient.

Experiments with the EBR–I indicated that the reactive instability occurred in the core, primarily, due to the change in the mass volume ratio caused by temperature conditions present therein. The neutron flux density, and, consequently, the heat generation, in a reactor is known to be greatest in the central region of the active portion and lessens with the distance from the center of the core. The curve representing the neutron flux density or the heat generation versus distance from core center approximates that of a cosine function. The temperature differentials between different parts of the active portion cause stresses in the structural members making up the active portion and particularly in the subassemblies containing the fissionable fuel material. These stresses are gerater for increased operating powers and/or reduced coolant flow rates, since the active portion temperature differentials are positively related thereto. These stresses result in the physical distortion and/or change of the spatial relationship of the fuel subassemblies with one another.

The EBR–I reactor as it was initially constructed had its active portion made up of a plurality of rod-shaped subassemblies containing the fissionable material. These subassemblies were cooled by passing thermal conducting NaK fluid around them. If the rod-shaped subassembly was subjected to conditions wherein one of its longitudinal sides was at a greater temperature than its opposite side, the subassembly became distorted and tended to bow convexly in the direction of the greatest temperature. Since the highest temperatures occur in the centermost region of the active portion, all of the fuel subassemblies tended to bow inwardly towards the central axis, thereby reducing the volume-to-mass ratio of the core and hence increasing the reactivity. The reactor thus had a positive temperature coefficient instability which under extreme operating conditions caused a portion of the reactor fuel loading to melt.

It is therefore an object of this invention to provide an active portion assembly for a fast neutron reactor in which temperature differentials will have a minimum effect on the volume-to-mass ratio.

It is also an object of this invention to provide an active portion assembly for a fast neutron reactor wherein physical distortions resulting in adverse changes in the volume-to-mass ratio will be minimized.

Other objects and advantages of this invention will be self-evident upon further reading of this specification when read in view of the accompanying drawings in which:

FIG. 1 is an elevation, partially in section, showing the active portion assembly;

FIG. 2 is a horizontal section taken along the line 2—2 of FIG. 1 showing the cross section of the active portion assembly at the core region of the reactor;

FIG. 4 is a vertical section taken along the line 4—4 in FIG. 3 showing the means for aligning and tightening the active portion assembly;

FIG. 5 is a vertical section taken along the line 5—5 of FIG. 2 showing the means for flowing coolant through the active portion assembly;

FIG. 6 is a partial vertical section taken along the line 6—6 in FIG. 3 showing the actuating mechanism for the seal plate clamps for holding the upper parts of the fuel and blanket subassemblies in rigid alignment;

FIG. 7 is a vertical section taken along the line 7—7 of FIG. 2 showing the double-wedge clamping mechanism for holding the lower parts of the fuel and blanket subassemblies in rigid alignment;

FIG. 8 is a vertical section of a fuel subassembly;

FIG. 9 is a horizontal section taken along the line 9—9 of FIG. 8;

FIG. 10 is a horizontal view partly in section taken along the line 10—10 of FIG. 8 showing the fuel subassembly end cap;

FIG. 11 is a vertical section of a fuel rod;

FIG. 12 is an elevation, partially in section, of a fuel rod locking device;

FIG. 13 is an enlarged vertical section of part of the mechanism of the locking device shown in FIG. 12;

FIG. 14 is a horizontal section taken on line 14—14 of FIG. 8 and showing the relationship between the locking device and the surrounding fuel rods;

FIG. 15 is an elevation, with parts broken away, of a blanket subassembly;

FIG. 16 is a vertical section of a blanket rod;

FIG. 17 is a vertical section taken along the line 17—17 of FIG. 3 showing a coolant-inlet-valve mechanism; and FIG. 18 is a vertical section taken along the line 18—18 of FIG. 3 showing a throttle valve and actuating mechanism.

Figure 3:
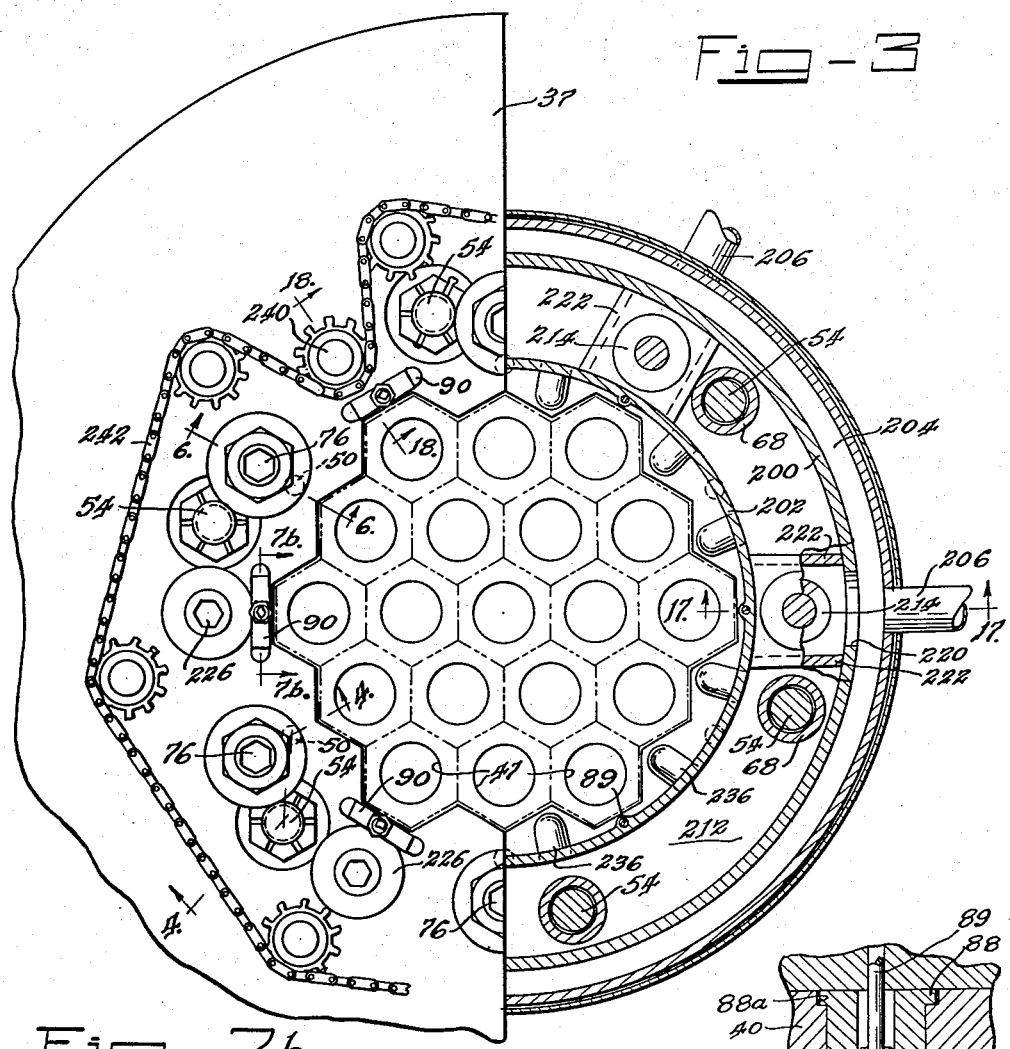
FIG. 3 is a plan view, partially in section, taken along the line 3—3 of FIG. 1, showing some of the actuator mechanisms for valves and holding devices.

The active portion assembly 30 shown in the above-listed drawings and described in detail in this specification is designed specifically for use in the reactor disclosed in the hereinbefore-referenced "Proceedings of the International Conference on the Peaceful Uses of Atomic Energy." The active portion assembly, hereinafter referenced 30, fits within the structure illustrated as the reactor tank in the drawing on page 346 of the "Proceedings" reference. The reactor tank is shown surrounding the active portion assembly 30 in FIG. 1 of the accompanying drawings and is referenced with the numeral 32.

As shown in FIGS. 1 and 2, the active portion assembly 30 comprises nineteen elongated hexagonally cross-sectional subassemblies 34 maintained in a hexagonal lattice arrangement by a plurality of stainless steel disks 37, 38, 39 and 40 of varying diameters. The bottom portions of the arranged subassemblies 34 form an active portion 42 including a core region 43 and a surrounding blanket 44. The smallest disks 40 surround the active region 42 of the subassemblies 34. The disks 40 are approximately four inches thick with an outer diameter of approximately 15.8 inches. As shown in FIG. 2, each of the disks 40 has an aperture 45 with an inner surface configuration conforming to the perimetrical shape of the hexagonally arranged subassemblies 34. (FIG. 2.) Below the disks 40 is a bottom plate 46 of 304 stainless steel, ¾ inch thick, having nineteen apertures 47 therein to receive each of the subassemblies 34. As shown in FIGS. 2 and 4, the bottom plate 46 is secured, along with the disks 40, to the larger disk 39 by means of six peripherally spaced tie rods 50. The larger disk 39 rests upon a shoulder 52 formed in the reactor tank 32 and provides support for the active portion assembly 30 therein. (FIGS. 1 and 5.) It will be noted that a space 53 is provided between the bottom plate 46 and the bottom of the reactor tank 32 which serves as an intermediate coolant plenum as hereinafter described.

The upper disks 38 maintain the subassemblies 34 in their hexagonal array along their upper length and are each approximately 3.5 inches thick with an outer diameter of approximately 23.3 inches as is the supporting disk 39. The top disk 37 has an outer diameter of approximately 37.3 inches and supports the various valve mechanisms, etc. hereinafter described. The disks 38 are maintained in alignment and secured by means of six tie rods 54 extending between the top plate 37 and the supporting plate 39.

An overflow coolant outlet plenum 56 is maintained near the top of the inner tank 32 by spacer tubes 58 surrounding each of the tie rods 54. A coolant outlet plenum 60 is maintained near the bottom of the stack of larger disks 38 by spacer tubes 62 extending between the lowermost large disk 38 and a seal plate 64 hereinafter described. Between the seal plate 64 and the support disk 39 is another separation 66, the contents and purpose of which will be hereinafter described. This separation is also maintained by means of spacer tubes 68 surrounding each of the tie rods 54.

The seal plate 64 prevents coolant from being short circuited between the outlet plenum 60 and the separation 66. On its outer periphery are two Inconel seat rings 70 as shown in FIG. 4. These rings may be expanded or contracted by a screw and toggle mechanism (not shown) buried in the seal plate and operated from the reactor top. On the inner edge of the seal plate 64 are clamps 72 consisting of six segmental shoes made of aluminum bronze which hold the arranged subassemblies 34 in a rigid bundle as well as minimize bypass leakage. These clamps have a hexagonal pattern on their inside edge to fit the subassembly bundle. As shown in FIG. 6, the shoes forming the seal plate clamps 72 are moved in a radial direction by a toggle mechanism 74 buried in the seal plate 64 and are operated from the reactor top by an extension rod 76 having a screw and nut mechanism actuatable at its upper end (not shown).

Figure 7B:
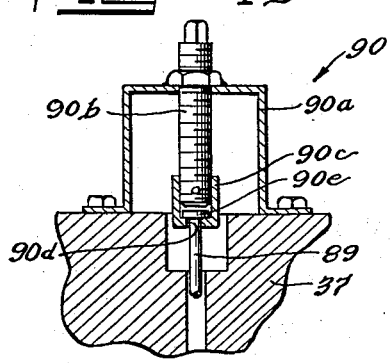
FIG. 7b is a vertical section taken along the line 7b—7b of FIG. 3 showing the clamping mechanism actuator.
Figure 7A:
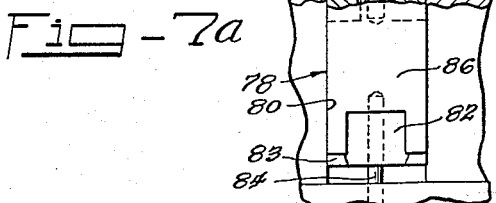
FIG. 7a is a vertical view partially in section taken along the line 7a—7a of FIG. 2.

The subassemblies 34 are maintained in a tight bundle in the region of the active portion 42 by six double-wedge type clamping devices 78 as shown in FIGS. 2 and 7 which are located within longitudinally extending recesses 80 in the smaller disk 40 surrounding the core region 43 at its vertical center plane. Each of the double-wedge type clamping mechanisms 78 has a longitudinally translatable wedge-shaped member 82 made of aluminum bronze. The member 82, having a sloping surface 83, slides longitudinally along a retaining spindle 84. A second wedge-shaped member 86, having a sloping surface 87 in abutment with the sloping surface 83 of member 82, is transversely translatable within the recess 80 when actuated by the longitudinal displacement of wedge-shaped member 82. As seen in FIG. 2, the sloping surfaces 83 and 87 on the members 82 and 86 are dovetailed to retract the member 86 with downward translation of the member 82. The member 86 is fabricated of stainless steel and is restrained from longitudinal translation by a flange 88 (FIG. 7a) on either side of the member 86 in cooperation with a horizontally extending groove 88a in the disk 40.

Each of the clamping mechanisms 78 is operable by means of a reach rod 89 extending through each of the disks 37, 38, 39 and 40 to an actuator mechanism 90 on the top of the reactor. The actuator mechanism can be any type of device which will impart longitudinal translation to the reach rod 89 without causing rotation of it. One type of mechanism 90 which may be used is shown in FIG. 7b and comprises a support bracket 90a threadedly engaging a bolt 90b which is pinned to a cup-shaped member 90c engaging through an aperture 90d in its bottom the flanged end 90e of the reach rod 89. Thus, through rotation of the bolt 90b the reach rod 89 is longitudinally translatable in either direction without rotation of the reach rod.

The clamping mechanisms 78 are peripherally spaced around the arranged subassemblies 34 so that they each engage a subassembly in the outermost ring of subassemblies along its outermost flat surface 92 tangent to an imaginary cylinder having its axis coincide with the central longitudinal axis of the center subassembly of the hexagonal array. The clamping mechanisms 78 are so positioned around the core region at the longitudinal center plane thereof to provide a tightly packed bundle restraining against any bowing tendencies which may be caused by temperature differentials in the region.

It will be noted that the wedge-type clamping mechanism is designed to clamp the arranged subassemblies when the reach rod 89 is translated in an upward direction. Thus, if the reach rod fractures, the clamping mechanism may be released by pushing downward on the remaining portion of the reach rod connected to the longitudinally translatable wedge-shaped member 82, and the subassemblies 34 may be readily removed.

There are two types of subassemblies 34 in the active portion of the reactor, namely the fuel subassemblies hereinafter referred to with the numeral 92 and the blanket subassemblies hereinafter referred to with the numeral 94. The fuel subassemblies 92 comprise the core region including the centermost subassembly and the six subassemblies immediately surrounding it. The blanket subassemblies 94 comprise the outermost ring of subassemblies and form the radial portion of the surrounding blanket 44.

As shown in FIGS. 8 and 9, the fuel subassemblies 92 each comprise 36 fuel rods 96 araranged in a hexagonal array around a centrally positioned locking device 98. The subassemblies are enclosed in a hexagonal cross-sectioned, Type 304 stainless steel tube 100 of approximately 2⅞ inch outside dimension across flats with a wall thickness of approximately 0.04 inch. At the bottom of the hexagonal tube 100 is a nozzle 102 which reduces from the hexagonal shape to that of a cylinder to be received by one of the apertures 47 in the inner tank bottom plate 46.

Immediately above the nozzle 102 and secured transversely within the hexagonal tube is a rod plate 104 which supports, locates and orients the fuel rods 96 and the tightening rod 98. The triangular holes 106 in the rod plate (FIG. 9) are adapted to receive the fuel rods 96 while the round holes 108 around the triangular holes 106 allow coolant to pass through the plate 104 and into the spaces between the rods.

A removable end cap 110 (FIGS. 8 and 10) is located at the upper end of the hexagonal tube 100 and comprises a substantially flat hexagonal plate 112 with three radially spaced bolts 114 threadedly engaged thereto. A collar-like member 116, having three arcuate-shaped slots 118 on its flanged portion 120 to receive the bolts 114, is rotatably mounted on said plate 112. The flanged portion 120 of the collar-like member 116 has outwardly extending protuberances 122 which each engage a respective aperture 124 in one of the flat sides of the hexagonal tube 100. The sleeve portion 126 of the collar-like member 116 has L-shaped slots 128 adapted to receive a manipulator mechanism to either remove the whole fuel subassembly 92 or to remove only the end cap fitting 110 to provide access to the individual fuel rods 96.

The lowermost pair of apertures 130 on each of the faces of the hexagonal tube 110 are outlet ports for coolant flowing upward to the fuel subassembly 92. The uppermost pair of apertures 132 on each face of the hexagonal tube 100 are exit ports for any overflow coolant.

Each fuel rod 96, as shown in FIG. 11, comprises the central cylindrical core section 134 and upper and lower blanket sections 136 and 138 respectively. The core section 134 is 0.364 inch in diameter and 8½ inches long, fabricated of a highly enriched uranium-2% zirconium alloy. The upper and lower blanket sections are both of natural uranium-2% zirconium alloy and are 7¾ and 3⁹⁄₁₆ inches long respectively. The three sections are welded end to end with a 0.010 inch Zircaloy II spacer 139 between them and are clad in a 0.020 inch thick Zircaloy II tube 140, bonded thereto by the coextrusion process. Zircaloy II is an alloy containing 98.2 wt. percent zirconium, 1.5 wt. percent tin, .15 wt. percent iron, .05 wt. percent nickel and .10 wt. percent chromium. Three peripherally spaced, longitudinally extending, 0.046 inch diameter zirconium wire ribs 141 are spot welded to the tube 140. The ribs 141 serve to maintain the rods in a spaced relationship for the flow of coolant therebetween.

At the bottom end of the fuel rod 96 is a Zircaloy II triangularly-shaped tip 142 (FIG. 9) adapted to be received by one of the triangular apertures 106 in the rod plate 104. At the upper end of the fuel rod 96 is a Zircaloy II fitting 144 with a threaded hole into which a Type 304 stainless steel handle 146 is screwed and locked. The handle 146 extends the length of the fuel subassembly 92 terminating just below the removable end cap 110 and is used for handling purposes as well as part of the upper shield. It has a reduced section 150 extending from just above the upper blanket section 136 to just above the outlet ports 130 in the fuel subassembly to facilitate coolant flow.

The maximum capacity of the core 43 is 252 fuel rods containing 60 kilograms of highly enriched uranium. The measured cold wet critical mass of the core is approximately 47.5 kilograms $U^{235}$.

The locking device 98 is a radially-expandable, elongated mechanism as shown in FIGS. 12, 13 and 14. It comprises a circular tube 152 having three longitudinally disposed slots 154 extending approximately the length of the active portion 42 of the reactor. The slots divide the tube 152 into three, flexible, equal-width arcuate segments 156 as shown in FIG. 14. Each of the arcuate segments 156 has a longitudinally extending groove 157 to receive a spacer wire 141 on an adjoining fuel rod 96. On each of the segments 156 are seven longitudinally disposed inwardly directed protuberances formed of segments of circular disks 158 welded within slots 160 in each of the arcuate segments 156 of the tube 152 (FIG. 13). Terminating the tube 152 at its lower end is a pointed tip 164 adapted to be received by the centermost triangular hole 106 in the rod plate 104 of the fuel subassembly 92.

Within the tube 152 is an axially translatable rod 166 having 21 longitudinally-disposed arcuate-shaped recesses 168, each adapted to receive a respective inwardly protruding segment 158.

The tube 152 and the axially translatable rod 166 extend upwardly and terminate within the sleeve portion 126 of the removable end cap 110. The upper end of the rod 166 threadedly engages a hexagonal nut 170 which abuts a flange 172 at the upper end of the tube 152.

Axial translation of the rod 166 within the tube 152 is accomplished by rotating the hexagonal nut 170 with an appropriate tool. The inwardly protruding segments 158 cooperating with the arcuate-shaped recesses 168 cause each of the arcuate segments 156 to deflect outwardly to tighten the surrounding fuel rods 96 within the fuel subassembly 92 in such a manner that they are restrained from bowing due to any temperature differentials within the subassembly.

The blanket subassemblies 94 are similar to the fuel subassemblies 92 and comprise a hexagonal-type, 304 stainless steel tube 174 of like dimensions. The tube 174 is made up of two sections 174a and 174b and joined together by a fitting 176 welded to the upper section 174a and screwed to the lower section 174b. The fitting 176 also serves as a coolant seal to prevent the passage of coolant upward therethrough. The bottom portion of the blanket subassembly 94 is identical to that of the fuel subassemblies 92, comprising the same nozzle 102 and rod plate 104, and therefore is not shown in FIG. 15 of the drawings.

The blanket subassembly 94 contains 36 blanket rods 178 arranged in a triangular lattice around a locking device 180 in the space between the rod plate and the seal plate 176. The blanket rods 178 will be hereinafter described. The locking device is identical to the type used in the fuel subassemblies 92 except that the circular tube 182 does not extend the length of the subassembly.

The upper two feet of the blanket subassembly 94 is a solid steel cylinder 184 of hexagonal cross section forming a part of the upper shield. The hexagonal cylinder 184 has a short sleeve-like extension 186 with an L-slot 188 therein adapted to be engaged by a manipulating tool to remove the subassembly from the reactor. It will be noted that the top of the blanket subassembly is not removable while still in the reactor. To remove the blanket rods 178 the subassembly 94 must be extracted from the reactor and the top portion 174 with the seal fitting 176 removed. The cylinder 184 has a pair of circular passages 190 through each of its flat sides near its upper end to provide for the passage of overflow coolant. There are two coolant passages 192 in each of the flat sides of the upper section of the tube 174a just above the seal fitting 176 which provide communication with the outlet plenum 60 of the inner tank 36. There is another pair of ports 193 on each of the flat surfaces at the upper end of the lower section of the tube 174b to provide communication with the separation 66 in the inner tank 36 as hereinafter described.

The blanket rod 178 as shown in FIG. 16 comprises a single cylinder 194 of natural uranium-2% zirconium alloy 19¹³⁄₁₆ inches long with a 0.364 inch diameter. The cylinder 194 is clad in a Zircaloy II tube 195 with a 0.02 inch thickness and bonded thereto by the coextrusion process. On the outside of the tube 195 are three peripherally-spaced .046 inch diameter zirconium wire ribs 196 which are spot welded thereto. The end of the blanket rod 178 is sealed by a triangularly-shaped tip 197 identical to the triangular tip 142 used on the fuel rods 96. At the upper end of the rod is a Zircaloy II piece 198 adapted to threadedly engage a short handle 199. It will be noted that blanket rods may be fitted with long extension handles such as used with the fuel rods and used in the fuel subassemblies 92 to fill any spaces not occupied by fuel rods.

The coolant system in the active portion assembly 30 of the reactor is designed for either parallel or series flow of the NaK coolant. That is, the coolant may be directed to flow through the blanket subassemblies and the fuel subassemblies simultaneously or may be directed to flow, first through the blanket subassemblies, and subsequently through the fuel subassemblies.

Within the separation 66, hereinbefore mentioned, is an outer annular baffle 200 and an inner annular baffle 202. The outer annular baffle 200 forms, with the reactor tank 32, an inlet plenum 204 for the cool NaK fluid entering the reactor through the inlet pipe 206 (FIGS. 3, 5 and 17). Within the space between the annular baffles 200 and 202 is a horizontally-disposed annular plate 208 dividing it into a lower annular plenum 210 and an upper annular plenum 212 (FIG. 5). Four peripherally-spaced, spool-type valves 214 (FIG. 17) each cooperate with a valve seat 216 in the horizontally-disposed ring plate 208 and an upper valve seat 218 to distribute the incoming coolant from the inlet plenum 204 through aperture 220 to the lower annular plenum 210 or the upper annular plenum 212 for parallel or series coolant flow respectively. Appropriate baffles 222 (FIG. 3) are provided on either side of the spool-type valves 214 to prevent incoming coolant from entering the upper annular plenum 212 when the valve 214 is in its lower position for parallel flow. The spool-type valve 214 has an upwardly extending extension 224 which terminates above the reactor in a valve actuating mechanism 226.

When the valve 214 is in its upper position the incoming coolant flows into the upper annular plenum 212 wherein it is distributed to each of the blanket subassemblies 94 through apertures 228 in the inner annular baffle and ports 193. The coolant flows downwardly within the blanket subassemblies 94 into the intermediate plenum 53 wherein it is distributed to each of the fuel subassemblies 92. The coolant flows upward in the fuel subassemblies 92 and is discharged through the outlet ports 130 of the fuel subassemblies and the outlet passages 192 of the blanket subassemblies 94 to the outlet plenum 60 wherein it is removed from the reactor tank 32 by outlet pipe 230.

A thermal baffle 232 is positioned above the seal plate 64 to remove thermal stresses in the seal plate due to temperature differentials between its upper and lower surfaces during series coolant flow operation. NaK coolant from the inlet plenum 204 is bled into the space between the thermal baffle 232 and the upper surface of the seal plate 64 by means of a ring of peripherally-spaced bleeder holes 234. The coolant travels radially, inwardly escaping between the inner edge of the thermal baffle 32 and the upper surface of the seal plate 64 into the outlet plenum 60.

In parallel flow operation the valve 214 is in its lower position so that the inlet fluid is introduced into the lower annular plenum 210 wherein it is distributed around the active portion assembly to twelve downcomer passages 236 near the outside edge of the support disk 39 and smaller disks 40 surrounding the active portion of the reactor. The coolant flows into the intermediate plenum 53 wherein some of it is introduced into the fuel subassemblies 92 and out through the outlet ports 130 and to the outlet plenum 60 as hereinbefore described in the series of flow operation.

The remaining coolant flows into the blanket subassemblies 94 passing upwardly and out through the ports 193 located just below the seal fitting 176 therein. The coolant flows into the upper annular plenum 212 and through two throttle valves 238 into the outlet plenum 60 as shown in FIG. 18.

Both of the throttle valves 238 have extensions 240 terminating above the reactor in a chain drive mechanism 242. The two throttle valves 238 may be operated while the reactor is in operation to vary the relative flow rates through the blanket subassemblies 94 and the fuel subassemblies 92, thus enabling the control of temperature distribution within the active portion of the reactor.

*Summary of design characteristics*

(1) Flow and temperature conditions—
  reactor core and inner blanket:
    Temperature of NaK in, °C _____ 228
    Temperature of NaK out, °C _____ 316
    Flow rate, g.p.m. _____ 292
    Total power produced—
      Kw _____ 1158
      B.t.u./hr _____ $3.95 \times 10^6$
    Power produced in core, kw _____ 960
    Power produced in internal blanket, kw ___ 196
(2) Dimensional data—reactor core:
    Fuel rod lattice spacing, in _____ 0.450
    Jacket, O.D., in _____ 0.404
    Fuel slug diameter, in _____ 0.364
    NaK bond thickness, in _____ 0.000
    Jacket, 0.020-inch wall _____ Zircaloy-II ribbed
    Cross-sectional area for coolant flow, ft$^2$ _ 0.0905
    Coolant velocity, f.p.s. _____ 7.4
    NaK flow area per lattice triangle, in$^2$ ___ 0.0204
    Percent flow area in lattice _____ 23.2
    NaK flow area per rod in lattice, in$^2$ ____ 0.0408
    Percent NaK flow area of total area _____ 26.5
    Core volume, liters _____ 6.07
    Total area of core section, ft$^2$ _____ 0.349
    Total fuel rod surface area, ft$^2$ _____ 16.4
(3) Heat transfer data—reactor core:
    Average heat flux—
      Cal./sec.-cm$^2$ _____ 15.0
      B.t.u./hr./ft$^2$ _____ 200,000
    Average power density, kw./liter _____ 158
    Average specific power, kw./kg _____ 18.3
    Ratio, maximum/average power _____ 1.35
    Maximum heat flux—
      Cal./sec.-cm$^2$ _____ 20.3
      B.t.u./hr./ft$^2$ _____ 22,500
    Maximum specific power, kw./kg _____ 24.7
(4) Inner blanket:
    Total surface area of rods, ft$^2$ _____ 30.4
    Average heat flux—
      Cal./sec.-cm$^2$ _____ 1.70
      B.t.u.hr./ft$^2$ _____ 22,500
    Total cross-sectional area of blanket
      section, ft$^2$ _____ 0.599
    Uranium area, ft$^2$ _____ 0.312
    Cross-sectional area for coolant flow, ft$^2$ _ 0.155
    Coolant velocity, series flow, f.p.s. ____ 4.3
(5) Outer blanket:
    Inlet air temperature, °C _____ 20
    Outlet air temperature, °C _____ 108
    Air flow rate, ft.$^3$/min _____ 5,800
    Power produced in outer blanket, kw _____ 213
(6) Nuclear data:
    Critical mass (wet, cold), kg _____ 47.5
    Core composition, volume percent—
      U _____ 49.5
      SS Type 304 _____ 7.3
      NaK _____ 25.6
      Zr _____ 17.6
    Radial inner blanket composition, volume
      percent—
      U _____ 48.9
      SS Type 304 _____ 7.3
      NaK _____ 25.6
      Zr _____ 18.2
    Upper and lower blanket composition,
      volume percent—
      U _____ 48.9
      SS Type 304 _____ 7.3
      NaK _____ 25.6
      Zr _____ 18.2

While the foregoing description of the invention describes an active portion assembly for a particular reactor in detail it is not intended that the scope of the in-

What is claimed is:

1. An active portion assembly for a fast neutron, liquid-cooled nuclear reactor comprising: a plurality of neutron-fissionable-fuel-containing subassemblies having equidimensioned hexagonal cross sections, said subassemblies being arranged in rings around a center subassembly with their sides in abutting relationship so that six of the outermost subassemblies each have an outermost side tangnet to an imaginary cylinder having its axis coincident with the central longitudinal axis of the center subassembly; a shell surrounding said subassemblies comprising a plurality of stacked disks each having an aperture therein corresponding in shape to the perimetrical shape of said arranged subassemblies, the disk surrounding said subassemblies adjacent the center plane perpendicular to the axis of the center subassembly of the active portion having recesses extending therethrough on its inner surface, each of said recesses positioned opposite one of said perpendicular sides of said six of the outermost subassemblies; six clamping devices, one device being associated with each of said recesses and comprising a longitudinally translatable first member located within said recess and having an inwardly facing surface inclined toward the longitudinal axis of the center subassembly, a second member within said recess having an outwardly facing surface abutting said inwardly facing surface of said first member, means providing for translation of the second member toward and away from said longitudinal axis and preventing translation of said second member parallel to said longitudinal axis, and means for effecting longitudinal translation of said first member.

2. An active portion assembly for a fast neutron liquid-cooled nuclear reactor comprising: a plurality of neutron-fissionable-fuel-containing subassemblies, said subassemblies being arranged in rings around a center subassembly, a shell surrounding said subassemblies comprising a plurality of stacked disks each having an aperture therein corresponding in shape to the perimetrical shape of said arranged subassemblies, the disk surrounding said subassemblies adjacent the center plane of the active portion perpendicular to the axis of the center subassembly having a plurality of peripherally equispaced recesses on its inner surface, a clamping device expandable toward said center subassembly disposed within each of said recesses.

3. An active portion assembly for a fast neutron, liquid-cooled nuclear reactor comprising: a plurality of neutron-fiissionable-fuel-containing subassemblies, each of said subassemblies comprising a cylindrical tube, a radially expandable locking device disposed within said tube and having its axis coinciding with the axis of said tube, and a plurality of rods containing neutron-fissionable mateiral longitudinally disposed around said locking device and within said tube in a hexagonal lattice arrangement; said subassemblies being arranged in rings around a center subassembly; a shell surrounding said subassemblies comprising a plurality of stacked disks each having an aperture therein corresponding in shape to the perimetrical shape of said arranged subassemblies, the disk surrounding said subassemblies adjacent the center plane of said active portion perpendicular to the longitudinal axis of said center subassembly having a plurality of peripherally equispaced recesses on its inner surface, a clamping device expandable toward said centermost subassembly disposed within each of said recesses.

4. An active portion assembly for a fast neutron, liquid-metal-cooled reactor comprising: a plurality of neutron-fissionable-fuel-containing subassemblies, each of said subassemblies comprising a cylindrical tube having a hexagonal cross section, a locking device disposed within said tube and having its axis coinciding with the axis of said hexagonal tube, a plurality of rods containing neutron-fissionable fuel longitudinally disposed around said locking assembly and within said tube in a hexagonal lattice arrangement, said locking assembly comprising a circular tube having three longitudinally disposed slots extending approximately the length of said fuel rods, said slots dividing said circular tube into three equal-width arcuate segments, a plurality of inwardly extending longitudinally disposed arcuate protuberances on each of the segments of said circular tube, an axially translatable rod within said circular tube having a plurality of longitudinally extending arcuate indentations positioned therein to receive said protuberances; said subassemblies being arranged in rings around a center subassembly; a shell surrounding said subassemblies comprising a plurality of stacked disks each having an aperture therein corresponding in shape to the perimetrical shape of said arranged subassemblies, the disk surrounding said subassemblies adjacent the center plane of said active portion perpendicular to the axis of the center subassembly having a plurality of peripherally equispaced recesses on its inner surface, a clamping device expandable toward said centermost subassembly disposed within each of said recesses.

5. An active portion assembly for a fast neutron, liquid-cooled nuclear reactor comprising: a plurality of neutron-fissionable-fuel-containing subassemblies having equidimensioned hexagonal cross sections, each of said subassemblies comprising a cylindrical tube, a radially expandable locking device disposed within said tube and having its axis coinciding with the axis of said tube, and a plurality of rods containing neutron-fissionable material longitudinally disposed around said locking assembly and within said tube in a hexagonal lattice arrangement; said subassemblies being arranged in rings around a center subassembly with their sides in abutting relationship so that six of the outermost subassemblies each have an outermost side tangent to an imaginary cylinder having its axis coincident with the central longitudinal axis of said center assembly; a shell surrounding said subassemblies comprising a plurality of stacked disks each having an aperture therein corresponding in shape to the perimetrical shape of said arranged subassemblies, the disk surrounding said subassemblies adjacent the center plane of the active portion perpendicular to the axis of the central subassembly having six recesses extending therethrough on its inner surface, each of said recesses positioned opposite one of said perpendicular sides of said six of the outermost subassemblies; six clamping devices, one device being associated with each of said recesses, and comprising a longitudinally translatable first member located within said recess, and having an inwardly facing surface inclined downwardly and inwardly toward the longitudinal center axis of the center subassembly, a second member within said recess having an outwardly facing surface abutting said inwardly facing surface of said first member, means for preventing longitudinal translation of said second member, and means for effecting longitudinal translation of said first member, said second member translatable toward and away from the central axis of said center subassembly responsive to longitudinal translation of said first member.

6. An active portion assembly for a fast neutron, liquid-cooled nuclear reactor comprising: a plurality of neutron-fissionable-fuel-containing subassemblies having equidimensioned hexagonal cross sections, each of said subassemblies comprising a cylindrical tube having a hexagonal cross section, a locking device disposed within said tube and having its axis coinciding with the axis of said hexagonal tube, a plurality of rods containing neutron-fissionable fuel longitudinally disposed around said locking device and within said tube in a hexagonal lattice arrangement, said locking assembly comprising a circular tube having three longitudinally disposed slots extending approximately the length of said fuel rods, said slots dividing said circular tube into three equal-width arcuate segments, a plurality of inwardly extending longitudinally disposed arcuate protuberances on each of the segments of said circular tube, an axially translatable rod within said circular tube having a plurality of longitudinally extending arcuate indentations positioned therein to receive said protuberances; said subassemblies being arranged in rings around a center subassembly with their sides in abutting relationship so that six of the outermost subassemblies each have an outermost side tangent to an imaginary cylinder having its axis coincident with the axis of said center subassembly; a shell surrounding said subassemblies comprising a plurality of stacked disks each having an aperture therein corresponding in shape to the perimetrical shape of said arranged subassemblies, the disk surrounding said subassemblies adjacent the longitudinal center plane of the active portion having six recesses extending therethrough on its inner surface, each of said recesses being positioned opposite one of said outermost sides of said six of the outermost subassemblies; six clamping devices, one device being associated with each of said recesses, and comprising a longitudinally translatable first member located within said recess, and having an inwardly facing surface inclined downwardly and inwardly toward the longitudinal axis of the center subassembly, a second member within said recess having an outwardly facing surface abutting said inwardly facing surface of said first member and an inwardly facing surface abutting said outermost side of one of said outermost subassemblies, means for preventing longitudinal translation of said second member, and means for effecting longitudinal translation of said first member, said second member translatable toward and away from the center axis of said center subassembly responsive to longitudinal translation of said first member.

7. An active portion assembly for a fast neutron, liquid-cooled nuclear reactor comprising: a plurality of neutron-fissionable-fuel-containing subassemblies, each of said subassemblies comprising a cylindrical tube, a radially expandable locking device disposed within said tube and having its axis coinciding with the axis of said tube, and a plurality of rods containing neutron-fissionable material longitudinally disposed around said locking device and within said tube in a hexagonal lattice arrangement; said subassemblies being arranged in rings around a center subassembly; a shell surrounding said subassemblies comprising a plurality of stacked disks each having an aperture therein corresponding in shape to the perimetrical shape of said arranged subassemblies, the disk surrounding said subassemblies adjacent the center plane of said active portion perpendicular to the longitudinal axis of said center subassembly having a plurality of peripherally equi-spaced recesses on its inner surface, a clamping device expandable toward said centermost subassembly disposed within each of said recesses, a second clamping device expandable toward said second subassembly and surrounding said arranged subassemblies above the fissionable fuel contained therein.

8. An active portion assembly for a fast neutron, liquid-cooled nuclear reactor comprising: a plurality of neutron-fissionable-fuel-containing subassemblies having equidimensioned hexagonal cross sections, each of said subassemblies comprising a cylindrical tube, a radially expandable locking device disposed within said tube and having its axis coinciding with the axis of said tube, and a plurality of rods containing neutron-fissionable material longitudinally disposed around said locking assembly and within said tube in a hexagonal lattice arrangement; said subassemblies being arranged in rings around a center subassembly with their sides in abutting relationship so that six of the outermost subassemblies each have an outermost side tangent to an imaginary cylinder having its axis coincident with the central longitudinal axis of said center assembly; a shell surrounding said subassemblies comprising a plurality of stacked disks each having an aperture therein corresponding in shape to the perimetrical shape of said arranged subassemblies, the disk surrounding said subassemblies adjacent the center plane of the active portion perpendicular to the axis of the central subassembly having six recesses extending therethrough on its inner surface, each of said recesses positioned opposite one of said perpendicular sides of said six of the outermost subassemblies; six clamping devices, one device being associated with each of said recesses, and comprising a longitudinally translatable first member located within said recess, and having an inwardly facing surface inclined downwardly and inwardly toward the longitudinal center axis of the center subassembly, a second member within said recess having an outwardly facing surface abutting said inwardly facing surface of said first member, means for preventing longitudinal translation of said second member, means for effecting longitudinal translation of said first member, said second member translatable toward and away from the central axis of said center subassembly responsive to longitudinal translation of said first member, an annular plate surrounding the arranged subassembly above the fissionable fuel contained therein, six equi-dimensional-segmentary shoes disposed within an annular recess in said annular plate and adapted to engage said outermost subassembly, and means for translating each of said shoes radially inward to constrain said outermost subassembly toward said center subassembly.

References Cited in the file of this patent

UNITED STATES PATENTS

| | | |
|---|---|---|
| 2,415,033 | Nygren | Jan. 28, 1947 |
| 2,708,656 | Fermi et al. | May 17, 1955 |
| 2,832,733 | Szilard | Apr. 29, 1958 |
| 2,852,456 | Wade | Sept. 16, 1958 |
| 2,898,280 | Schultz | Aug. 4, 1959 |